United States Patent [19]

Spraker, Jr. et al.

[11] 3,994,620
[45] Nov. 30, 1976

[54] VARIABLE EXDUCER TURBINE CONTROL

[75] Inventors: Wilbur Allen Spraker, Jr.; Robert Lynn Stewart, both of Indianapolis, Ind.

[73] Assignee: Wallace-Murray Corporation, New York, N.Y.

[22] Filed: June 30, 1975

[21] Appl. No.: 592,090

[52] U.S. Cl. .................... 415/145; 415/157; 415/209; 415/205
[51] Int. Cl.² ......................................... F01D 17/00
[58] Field of Search ........... 415/157, 158, 145, 144, 415/205, 209

[56] References Cited
UNITED STATES PATENTS

| | | | |
|---|---|---|---|
| 1,038,977 | 9/1912 | Singrun | 415/157 |
| 2,730,861 | 1/1956 | Buchi | 415/205 |
| 2,874,642 | 2/1959 | Forrest | 415/157 |
| 3,045,894 | 7/1962 | Russ | 415/157 |
| 3,144,913 | 8/1964 | Bailey | 415/205 |
| 3,504,986 | 4/1970 | Jackson | 415/157 |
| 3,893,785 | 7/1975 | Maron | 415/157 |

FOREIGN PATENTS OR APPLICATIONS

| | | | |
|---|---|---|---|
| 57,029 | 12/1912 | Austria | 415/145 |
| 1,224,445 | 2/1960 | France | 415/157 |
| 947,690 | 1/1964 | United Kingdom | 415/209 |
| 214,423 | 4/1924 | United Kingdom | 415/158 |

*Primary Examiner*—Henry F. Raduazo
*Attorney, Agent, or Firm*—Thomas J. Greer, Jr.

[57] ABSTRACT

A device for varying the operating characteristics of a turbocharger. A control ring is adjustably mounted within the turbine exhaust passage, adjacent and partially surrounding the exducer portion of the turbine impeller. Axial movement of the ring relative to the impeller changes the proportion of gas which passes completely through the exducer portion. Exducer flow is thus variably bled, the bled portion of the gases passing over the outer surface of the ring.

10 Claims, 5 Drawing Figures

VARIABLE EXDUCER TURBINE CONTROL

This invention relates to the control of turbo superchargers as applied to internal combustion engines, and more particularly to the control of the turbine operating characteristics so that the turbocharger operation better matches the engine requirements. Turbochargers are generally used to increase the airflow rate and inlet pressure of an internal combustion engine thereby increasing the power output and the efficiency of the engine. In the usual installation a centrifugal compressor is driven by a radial inflow turbine which is powered by the engine exhaust gases. If the geometry of the compressor and turbine are fixed, as is the usual case, it is difficult to provide proper operation of the turbocharger over the range of desired engine operation from idle to maximum power conditions. If the turbocharger is designed to operate at the engine idle speed, it is found that excessive turbocharger speed and engine supply pressure are provided at maximum power. Conversely, if the turbocharger is matched to maximum power it is found that turbocharger speed is too low, and airflow and inlet pressure are therefore too low at idle. Under these conditions engine power output is less than desired and excessive exhaust smoke and temperature may be generated.

A number of arrangements have been used in the prior art to overcome these difficulties. One approach is a wastegate which provides a bypass for engine exhaust air around the turbine, thus limiting turbocharger rotational speed and boost pressure. Other approaches include (but are not necessarily limited to) rotating or movable vanes in the turbine housing ahead of the turbine impeller (Angell — U.S. Pat. No. 2,944,786), a valve in the turbine housing to direct the flow to one or both sides of a divided housing (Nancarrow — U.S. Pat. No. 3,423,926), a valve in the exhaust manifold ahead of the turbocharger (Cowland — U.S. Pat. No. 2,838,907), and movable turbine inlet nozzles (Erwin — U.S. Pat. No. 3,639,075). Each of these constructions either produces excessive aerodynamic losses and thus reduces efficiency, or requires complex mechanisms which present a reliability problem in the turbocharger operating environment.

It is observed that all of the turbocharger control mechanisms found in the prior art of which I am aware operate by changing the flow conditions ahead of the turbine impeller. Investigation of the performance of the impeller reveals that of the order of two-thirds of the power output of the impeller results from radial flow (of engine exhaust gases) in the impeller vane passages and approximately one-third of the power output results from turning the air in the impeller exducer. The exducer is the portion of the impeller blade system in which the impeller blades turn from a substantially axial direction to a significant angle in a direction opposite to the rotation of the turbine. Accordingly, the power output, and therefore the rotational speed of the turbocharger, may be modified and controlled if the airflow rate through the exducer portion of the impeller wheel is reduced relative to that through the turbine inlet housing and the radial portion of the turbine blading. This concept, referred to as exducer bleed, offers a potential advantage in that the air having passed undisturbed through the turbine inlet housing and the radial portion of the blade has accomplished a significant percentage of its total energy transfer. Exducer bleed therefore produces a minimum degradation of turbine efficiency.

The air bled off from the exducer still has a significant energy content since it is bled off at a point where the pressure is significantly above the turbine discharge pressure. The energy content of this air may be partially recovered by using it as the drive media for a jet pump at the exducer discharge to reduce the pressure at the exducer discharger while raising the pressure downstream at the turbine housing discharge.

According to the practice of this invention, an improved arrangement for turbocharger control is provided by means of exducer bleed, coupled with a bleed air driven jet pump at the exducer discharge. Such turbocharger turbines typically are 3 to 5 inches in diameter. The exducer is usually cylindrical in its exterior dimension and has a tip diameter varying from 75 to 90% of the turbine tip diameter. The exducer hub diameter is typically about 40% of the exducer tip diameter. Turbine inlet temperature may range from 800° to 1,300° F depending on the engine operating conditions and the turbocharger will have a top speed in the range of 70,000 RPM to 120,000 RPM depending on its size. Turbine inlet pressure will vary from as high as 3.5 atmospheres at maximum power to 1.5 atmospheres at idle, depending on the operating characteristics of the particular engine to which the turbocharger is applied. Turbine discharge pressure is normally slightly above atmospheric pressure.

Figure 1:
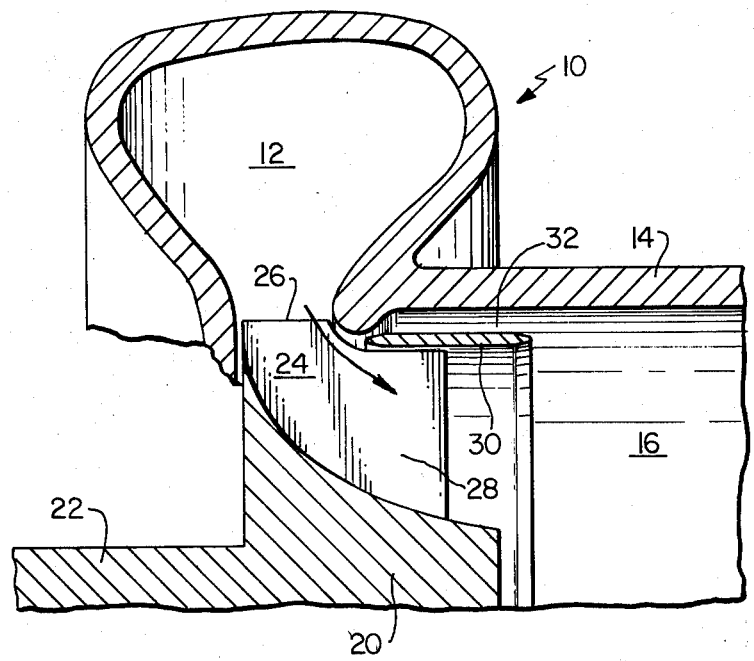
FIG. 1 is a partial elevational view of a turbine provided with an exducer bleed control ring and illustrates the principle of the invention.

Referring now to FIG. 1 of the drawings, the numeral 10 denotes generally a portion of a turbocharger housing, the housing including annular chamber 12 for the reception of exhaust gases from an internal combustion engine. The numeral 14 denotes a portion of the turbine exhaust, the interior thereof denoted by the numeral 16. A turbine wheel (also known as an impeller) of typical construction is denoted by the numeral 20 and, conventionally, includes shaft 22 adapted to be coupled to the compressor portion (not illustrated) of the turbocharger. The numeral 24 denotes any one of a plurality of individual impeller blades, the radially outermost portion of which is denoted by the numeral 26 and the exducer portion of which is denoted by the numeral 28. Exhaust gases from the engine are fed to chamber 12 and pass radially inwardly to the portion 26 of each impeller blade, thence past the exducer portion 28 to exhaust. The numeral 30 denotes a control ring mounted within exhaust passage 16 and defines an annular space or zone 32 between the interior of housing portion 14 and the radially outermost surfaces of the control ring 30. The control ring is illustrated in its left extreme position and is adapted to be moved to the right, and thence towards the left, etc., depending on engine operating conditions which are to be later described.

The zone 32 defines an annular bleed passage between the control ring 30 and the inside surface of the turbine housing discharge 14, i.e., the surface of exhaust passage 16. When the control ring is moved toward the turbine to the closed, leftmost position illustrated, no bleed takes place and the turbine behaves in the normal manner. The flow of gas is indicated by the curved arrow. As the control ring is moved away from the turbine the area of the bleed slot (between the left edge of the control ring and blade portions 26) increases and the bleed flow rate increases. Typically, it is desirable to reduce the turbine power output by as much as 10% at the maximum power engine operating condition and this requires that 20 to 30% of the turbine airflow be bled through the bleed slot. In a typical application on a 3 inch tip diameter turbine the radial thickness of bleed passage 32 is approximately 0.25 inch. This dimension is a function of the particular turbine design and the amount of power reduction required.

Figure 2:
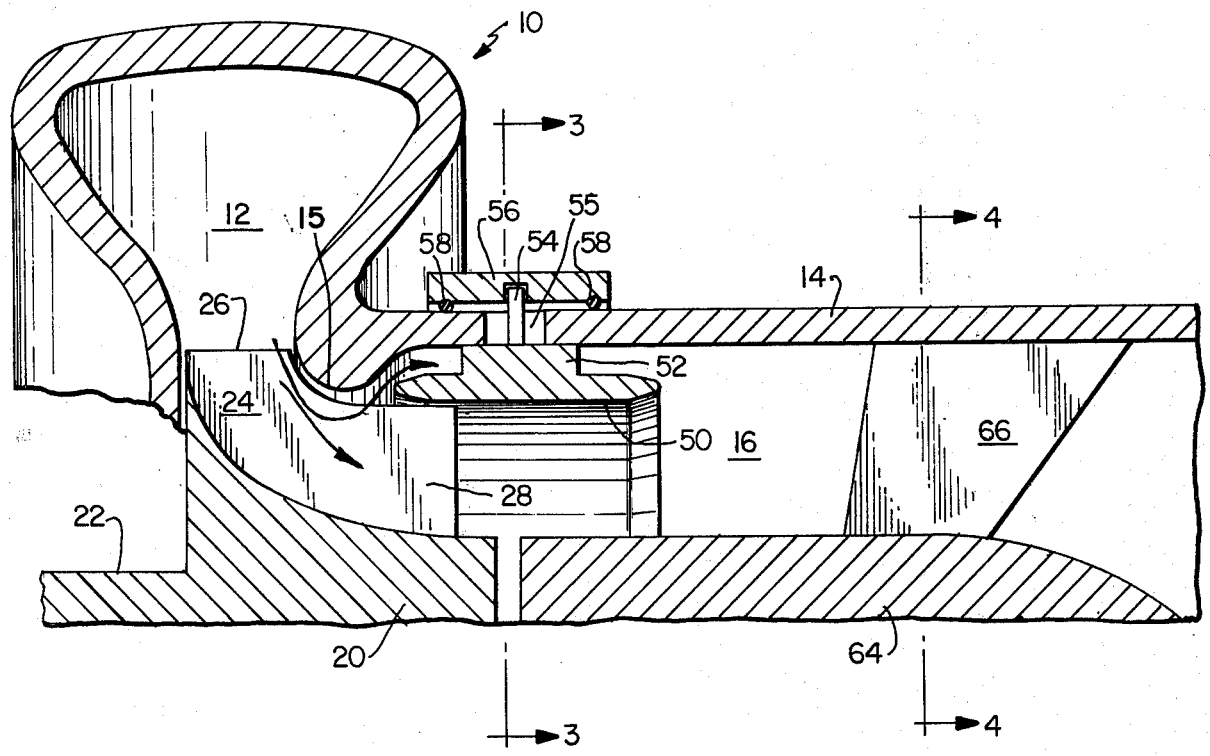
FIG. 2 is a view similar to FIG. 1 and illustrates the practice of the invention according to an embodiment.
Figure 3:
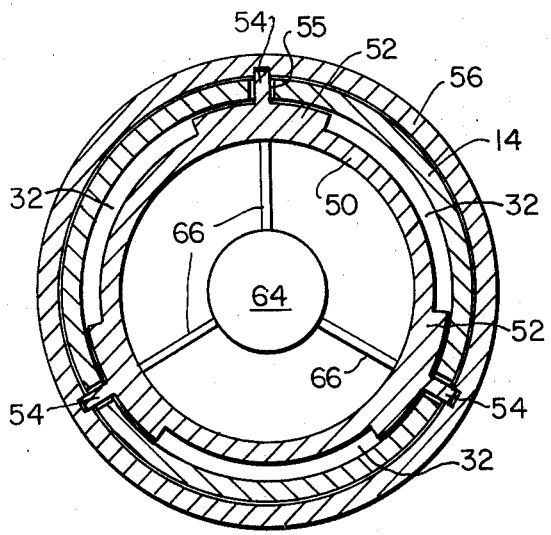
FIG. 3 is a view taken along section 3—3 of FIG. 2.

FIG. 2 illustrates a specific embodiment of the invention. The reader will note the similarity of several reference numerals which denote corresponding elements in both FIGS. 1 and 2. The control ring in FIG. 2 is denoted by the numeral 50 and is provided with angularly spaced land portions 52. Lands 52 in turn carry pins 54 which extend radially outwardly through slots 55 in annular exhaust portion 14. The pins 54 are carried by an external control member 56, this member assuming the form of a ring or annulus. Axially spaced seal elements 58, which may assume the form of O-rings are provided on the under surface of control member 56. Said O-rings referred to above might be of any material and form suitable for the high temperature environment. The seals are adapted to slide on exterior portions of exhaust 14. The axial extent of lands 52 is greater than the axial extent of slots 55, so that at both extremes of movement of the control ring 50, i.e., the right-hand extreme or the left-hand extreme, as viewed at FIG. 2, the lands will always cover the slots 55. Preferably, the material of construction of the housing 10 and control rings 50 and associated elements, except for the O-rings, is ductile iron so that clearance variations resulting from thermal expansion are minimized.

Figure 4:
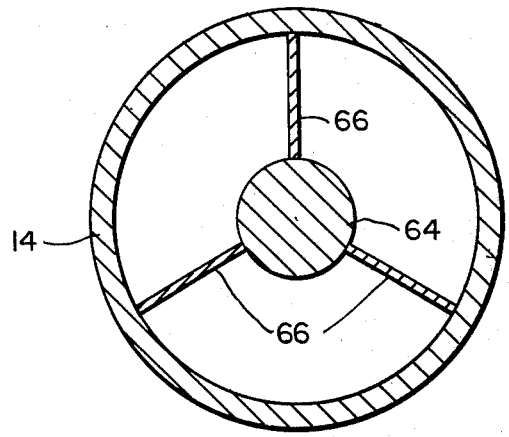
FIG. 4 is a view taken along section 4—4 of FIG. 2.

The discharge of the turbine bleed passage which surrounds the exducer discharge passage constitutes an ejector pump. Some mixing and static pressure recovery from this ejector pump will take place with the configuration shown in FIG. 1. However, it may be desirable to provide a more efficient discharge configuration to maximize turbine efficiency. For the purpose of preventing sudden expansion of the bled or bypassed air, a generally conical diffuser denoted by the numeral in FIG. 2 is supported by support members 66 in exhaust 16, the exhaust passing to ambient. Reference to FIG. 4 also illustrates the diffuser configuration. The conical diffuser 64 is positioned with one end adjacent the impeller wheel 20 and its right end tapered as illustrated. The conical diffuser admits of a slower gradation of energy loss.

It will be seen that movement of the control element 56 to the left or the right is accompanied by corresponding motion of control ring 50 to thereby vary the amount of exhaust gas which passes through the exducer portion of the turbine wheel. The curved arrows at FIG. 2 indicate the bled portion (the upper arrow) and the remaining portion (the lower arrow). The bled portion passes over annular constriction 15 of housing 14 and thence radially outwardly and also axially through annular chamber 32. The greater the movement of ring 50 to the right, the greater the bled gas. Movement of control member 56 may be a function of the engine fuel controller position. For example, the bleed may remain closed up to some percentage of maximum power above which the control member 56 is moved progressively towards the right to increase the bleed by the control member 50 as power is advanced toward maximum. An alternative arrangement is to employ intake manifold pressure as the control signal, such pressure modulating the position of the bleed control ring 50 to maintain the intake manifold pressure at or below a desired value. The exducer bleed may remain closed and the turbine continue to operate in a normal manner throughout most of the engine operating range. Generally, the exducer bleed construction of this invention is employed or becomes effective only in the range of higher power and higher speed operation of the engine.

Figure 5:
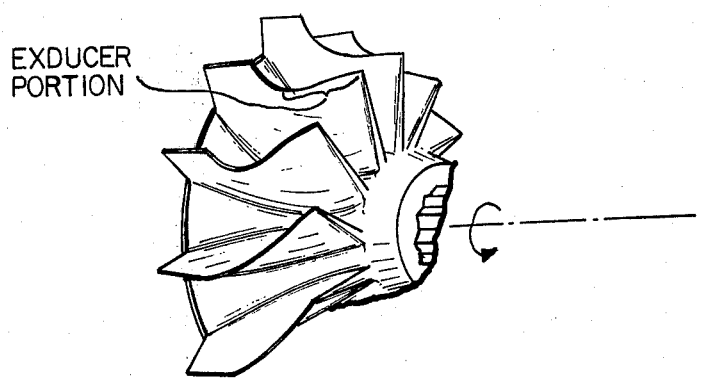
FIG. 5 is a partial perspective view of a typical impeller such as that of FIG. 1 or FIG. 2 and illustrates the exducer portion of an impeller.

FIG. 5 illustrates the exducer portion of a typical impeller. The curved arrow represents the direction of rotation of the impeller. The axial extent of the exducer portion is represented by the vinculum at the middle impeller blade. The reader can readily note that the exducer portion of the blade curves from an axial direction to a direction opposite the rotation.

I claim:

1. A turbine construction adapted for use in a turbocharger, the turbine including an annular chamber in the turbine housing for receiving engine exhaust gas for expansion through a turbine wheel, a turbine wheel mounted for rotation and having an exducer portion and adapted to receive exhaust gas from the annular chamber, an elongated exhaust passage which receives gas which has passed through the turbine wheel, the exducer portion of the turbine wheel positioned within an elongated exhaust passage, the improvement comprising, an annular zone of clearance between the radially outermost portions of the blades of the exducer portion of the turbine wheel and the interior wall of the elongated exhaust passage, a control ring in the form of an annulus positioned coaxially with the axis of rotation of the turbine wheel, said control ring having at least a portion thereof within said annular clearance zone, said control ring having a radial thickness less than the radial dimension of said annular clearance zone, said control ring having means for mounting said control ring for back and forth axial movement, whereby when the control ring is in one extreme position about the exducer portion substantially all gas entering the turbine wheel passes axially out the exducer portion of the turbine wheel, and whereby when the control ring is axially moved in a direction away from the one extreme position a portion of the gas entering the turbine wheel exits radially outwardly of the exducer portion and axially between the control ring and exhaust passage, such latter-mentioned gas portion remaining within said elongated exhaust passage, whereby the bled gas acts as the driving fluid for a jet pump.

2. The turbine construction of claim 1 wherein the axial extent of said control ring is such that one axial end thereof extends axially beyond the turbine wheel in the said one extreme position of the control ring.

3. The turbine construction of claim 2 wherein said control ring carries a plurality of radially outwardly extending lands, each land carrying a radially outwardly extending pin passing through an axially extending slot in the wall of said elongated exhaust passage, the pins secured to an actuating ring carried on the exterior of said elongated exhaust passage, the axial extent of said lands being greater than the axial extent of said slots such that said lands cover said slots in all axial positions of said control ring.

4. The turbine construction of claim 3 including means for sealing said slots to inhibit communication between the interior of said elongated exhaust passage and ambient, 5. The turbine construction of claim 4 wherein said means for sealing comprises two axially spaced O-rings carried by the underside of said actuating ring, one O-ring positioned on each side of said slots.

6. The turbine construction of claim 3 wherein the radially outermost surfaces of said lands slidingly contact the innermost surface of said elongated exhaust passage adjacent said slots.

7. The turbine construction of claim 1 including an axially extending diffuser body mounted coaxially of said elongated exhaust passage, said diffuser body positioned downstream of said turbine wheel.

8. The turbine construction of claim 3 including an axially extending diffuser body mounted coaxially of said elongated exhaust chamber, said diffuser body positioned downstream of said turbine wheel.

9. The turbine construction of claim 5 including an axially extending diffuser body mounted coaxially of said elongated exhaust chamber, said diffuser body positioned downstream of said turbine wheel.

10. A turbine construction adapted for use in a turbocharger, the turbine including an annular radial input chamber in the turbine housing for receiving engine exhaust gas for expansion through a turbine wheel, a turbine wheel mounted for rotation and adapted to receive exhaust gas from the annular chamber, the exducer portion of the turbine wheel positioned within an elongated exhaust passage, the improvement comprising, an annular constriction at the junction of the elongated exhaust passage and the annular radial input chamber, said constriction being of lesser diameter than the diameter of the adjacent portion of the interior of the exhaust chamber, a control ring positioned coaxially with the axis of rotation of the turbine wheel, said control ring carried by the housing and means for mounting said control ring for back and forth axial movement, one edge of the control ring positioned contiguous to the said annular constriction in one axial back and forth position of the control ring, the control ring being radially spaced from the interior of the exhaust passage adjacent the annular constriction and the exducer portion of the turbine wheel, whereby gas passing radially outwardly of and along the control ring returns to the elongated exhaust passage after axially passing the control ring when said ring is in its other position.

* * * * *